United States Patent [19]
Bloom

[11] Patent Number: 4,853,668
[45] Date of Patent: Aug. 1, 1989

[54] INTEGRATED MAGNETIC CONVERTER CORE

[76] Inventor: Gordon E. Bloom, 115 Duran Dr., San Rafael, Calif. 94903

[21] Appl. No.: 137,548

[22] Filed: Dec. 23, 1987

[51] Int. Cl.$^4$ .............................................. H01F 27/24
[52] U.S. Cl. .................................... 336/214; 336/170; 323/362
[58] Field of Search ................ 323/355, 362; 336/170, 336/171, 214

[56] References Cited

U.S. PATENT DOCUMENTS

| | | | |
|---|---|---|---|
| 3,175,175 | 3/1965 | Hauck | 336/170 |
| 3,553,620 | 1/1971 | Cielo et al. | 363/25 |
| 3,694,726 | 9/1972 | Cielo et al. | 363/25 |
| 4,257,087 | 3/1981 | Cuk | 363/16 |
| 4,262,328 | 4/1981 | Bloom et al. | 363/16 |
| 4,355,352 | 10/1982 | Bloom et al. | 363/16 |
| 4,538,219 | 8/1985 | Morris et al. | 363/26 |
| 4,561,046 | 12/1985 | Kuster | 363/21 |
| 4,675,796 | 6/1987 | Gautherin et al. | 363/20 |
| 4,675,797 | 6/1987 | Vinciarelli | 363/21 |
| 4,688,160 | 8/1987 | Fraidlin | 363/21 |

OTHER PUBLICATIONS

Modern DC-To-DC Switchmode Power Converter Circuits by R. Severns & C. Bloom Van Nostrand Reinhold Co., 85.
Core Selection for an Design Aspects of an Integrated—Magnetic Forward Converter, by E. Bloom, IEEE Applied Power Electronics Conference, New Orleans, Conference Proceedings, Apr. 1986, pp. 141–150.
New Integrated—Magnetic DC-DC Power Converter Circuits and Systems, by E. Bloom, IEEE Applied Power Electronics Conference, San Diego, Conference Proceedings, Mar. 2, 1987, pp. 57–66.
"Soft Ferrites, Properties and Applications", by E. C. Snelling, ILIEEE Books Ltd., of London, 1969.
"Integrated Magnetics Versus Conventional Power Filtering" by S. Cuk (IEEE Cat. No. CH2477-8/87-00-0-0061) and Chapters 28 (vol. 2), 2, 15 and 21 (vol. 3).
"Modern DC-To-DC Switched-Mode Power Conversion" by R. D. Middlebrook et al.; TESLAco, Pasadena, California (1983).

Primary Examiner—Patrick R. Salce
Assistant Examiner—Jeffrey Sterrett

[57] ABSTRACT

Novel switched mode boost-buck integrated magnetic power converters are disclosed featuring unique core shapes, two winding bobbins, a core which provides electro-magnetic shielding, and cores which are readily adapted to accept a wide range of converter topologies.

28 Claims, 12 Drawing Sheets

FIG. 6
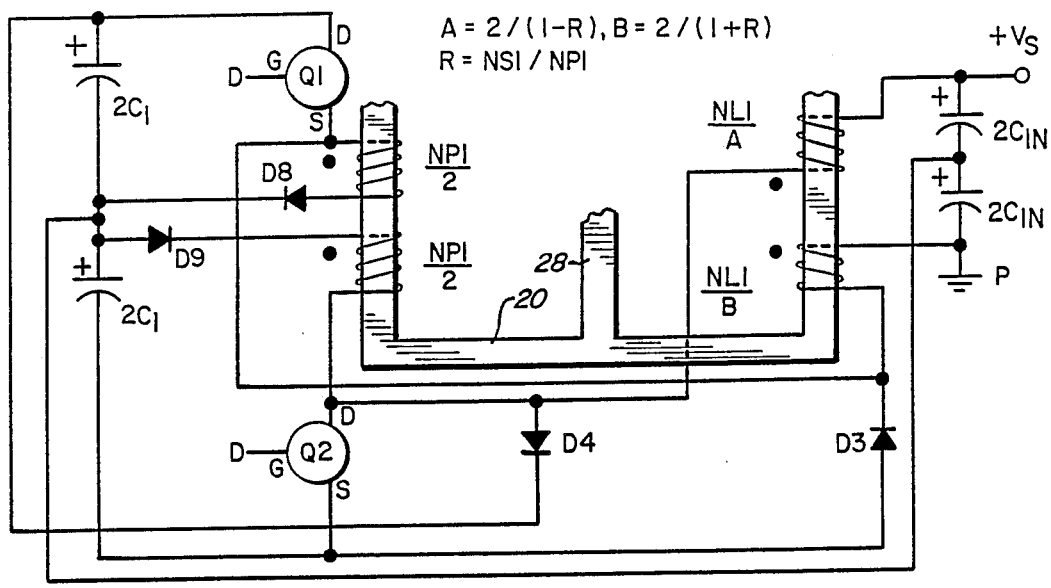
$A = 2/(1-R), B = 2/(1+R)$
$R = NS1/NP1$
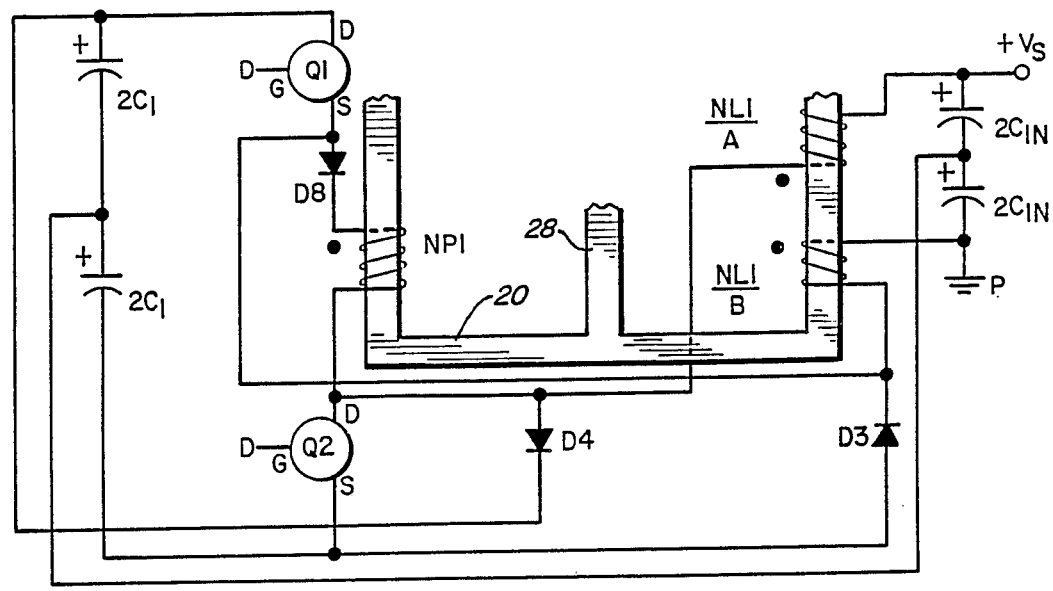
FIG. 6A

START-UP CIRCUIT

INTEGRATED MAGNETIC CONVERTER CORE

TECHNICAL FIELD

This invention relates, in general, to the subject of converters and power supplies and, in particular, to a core for an integrated-magnetic converter which produces plurality of DC output voltages from an AC supply voltage.

This application is related to two patent applications by the same inventor and filed on the same date; those patent applications are entitled, "INTEGRATED-MAGNETIC POWER CONVERTER" (Ser. No. 137,550) and "START-UP CIRCUIT FOR AN INTEGRATED-MAGNETIC POWER CONVERTER" (Ser. No. 137,494).

BACKGROUND OF THE INVENTION

There have been significant advances in the microminiaturization of electronic systems and this has spurred the creation of space-saving switchmode conversion techniques for the design of highly efficient power processing equipment. An excellent overview of the state of the art is presented in the book "*Modern DC-to-DC Switchmode Power Converter Circuits,*" by Rudolf P. Severns and Gordon E. Bloom, Van Nostrand Reinhold Company, 1985.

A continuing goal of electrical engineers has been the goal of reducing the physical size and parts count of switchmode power converters. The blending together or combining of inductors and transformers into single physical assemblies with little of no compromise in the desired conversion characteristics has been termed "integrated magnetics". One important reason for this effort has been the fact that inductors and transformers are major contributors to the total cost, weight and size of a converter system. Magnetic integration, if properly executed in the design of power converters, can bring added benefits in electrical performance, such as reduced stress on the components or lower ripple currents on input and output power lines. Chapter 12 of the textbook previously cited provides an excellent foundation on the subject of integrated magnetics. Two other pertinent publications authored by Gordon Bloom are:

*Core Selection for an Design Aspects of an Integrated— Magnetic Forward Converter,* By Ed Bloom, IEEE Applied Power Electronics Conference, New Orleans, Conference Proceedings, April 1986, pages 141-150;

*New Integrated—Magnetic DC-DC Power Converter Circuits and Systems,* by Ed Bloom, IEEE Applied Power Electronics Conference, San Diego, Conference Proceedings, Mar. 2, 1987, pages 57-66.

Some U.S. Patents on the subject of integrated magnetics and converters are U.S. Pat. Nos.: 4,675,797, 4,675,796, 4,838,219, 4,257,087, 3,694,726, 4,688,160, 4,561,046, 4,355,352, 4,262,328, 3,553,620. The textbook "*Soft Ferrites, Properties and Applications*", by E. C Snelling, ILIFFE Books LTD of London, 1969, provides a comprehensive discussion of core design and magnetic component performance (See Chapters 5 and 6). The recent paper by Slobodan Cuk entitled, "*Integrated Magnetics versus Conventional Power Filtering,*" (IEEE Cat. No. CH2477-8/87-000-0061) and Chapters 28 (Vol. 2), 2, 15 and 21 (Vol. 3) of the book "*Modern DC-to-DC Switched-Mode Power Conversion,*" by R. D. Middlebrook and Slobodan Cuk; TESLAco, Pasadena, Calif. (1983), cover integrated magnetic core design. One manufacture of ferrite transformer cores is Ferroxcube, a division of North American Phillips Corporation, in Saugerties, N.Y.

However, the process of magnetic integration is not simple. For the most part, integrating magnetic elements of a converter does not add to the many design aspects and difficulties with which an engineer must contend during the converter's development phase. However, it does place additional burden on the designer to properly specify the performance of the integrated magnetic elements and a burden on the manufacturer to insure a consistent product which can be more complex than a simple transformer or inductor assembly. For example, there are some subtle electrical problems which arise when coupling inductors together on a common magnetic core. Imbalances in the required turns ratio relationships between the inductor and transformer windings can produce circulating currents in filter networks, resuling in excessive ripple current. High power loss in filter capacitors can result in converter damage and even destruction of the filter elements. Thus, integrated magnetics, as applied to switchmode power converter circuits, is a concept which is not straight-forward or easy to apply in practice.

Any advancement that can be made and any teaching in this highly complex subject area will be welcomed by those skilled in the art, and any practical embodiment of these teachings will advance the state of the art. This is particularly true if subtle design considerations are highlighted and circuits are presented which result in improved performance or operating characteristics, especially when the heavy magnetic parts of the converter core are reduced in size and/or weight or if an optimal use is made of core material.

OBJECTS OF THE INVENTION

Accordingly, its a basic object of the invention to disclose several unique integrated magnetic switchmode power converter cores.

It is another object of the invention to provide an integrated magnetic assembly for two bobbin converters which has an unusual core design and special advantages.

It is still another object of the invention to disclose several new and unique two bobbin converter cores which make the most use of the available magnetic material.

The many advantages and features of the invention will become readily apparent from the following detailed description of the invention, and the embodiments thereof, and from the claims and from the accompanying drawings.

BRIEF DESCRIPTION OF THE DRAWINGS

FIGS. 6 and 6A are partial schematic diagrams of still other embodiments of a converter that is the subject of the present application;

DETAILED DESCRIPTION

Figure 1:
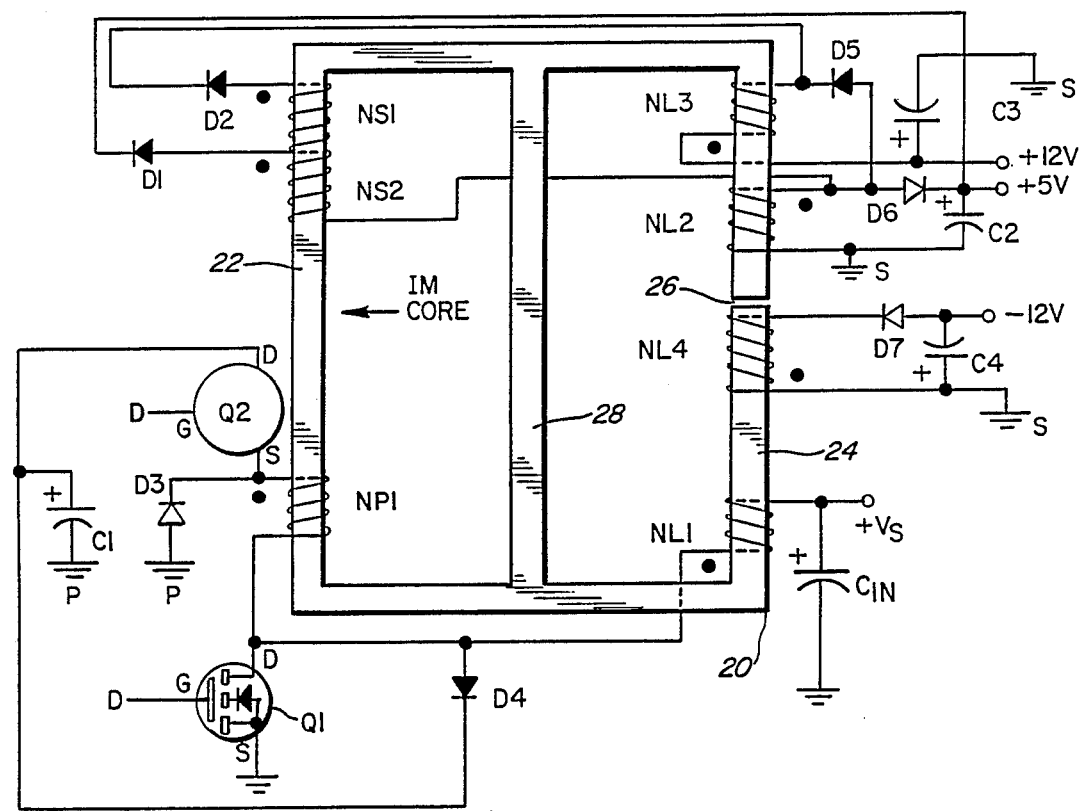
FIG. 1 is a schematic diagram of a transformerisolated forward, or buck, converter topology (proceeded by a boost converter circuit) of one basic embodiment of the present invention.

While this invention is susceptible to embodiment in many different forms, there is shown in the drawings, and will herein be described in detail, several preferred embodiments of the invention. It should be understood, however, that the present disclosure is to be considered as exemplification of the principles of the invention and that it is not intended to limit the invention to specific embodiments illustrated.

Throughout the discussion which follows, it should be understood that the terms "diode" and "switch" are used in the functional sense and not exclusively with reference to ordinary solid-state components or mechanical equivalents. Similarly, the term "converter" is used in the broadest sense of the word so as to include inverters and devices which perform AC to DC, DC to AC, DC to DC, and AC to AC conversion. Before focusing on detailed design considerations and circuit arrangements, one basic design for a power converter will be described in detail.

BASIC CONVERTER

The power converter design, shown in basic form in FIG. 1, is based on a transformer-isolated forward, or buck, converter topology that is preceded by a boost converter circuit. The primary advantage of this tandem arrangement of converter stages is both low and non-pulsing input and output current characteristics. Also, this converter can be designed for lower variations in switch ON times with large variations in input voltage and output loads relative to a comparable single-stage converter. The ideal end-to-end DC voltage gain of this converter is simply nD/ (1-D), where "D" represents the duty cycle of conduction of both converter switches Q1 and Q2 over one switching cycle of power conversion, with "n" representing the secondary-to-primary turns ratio of the applicable "transformer" part of the IM (integrated magnetics) assembly (e.g, for the +12V output, n=(NS1+NS2)/NP1). Note, winding "dots" are relative to winding NP1 in FIGS. 1 thru 12.

The IM assembly itself, in one embodiment, consists of a special E—E ferrite core 20 (Also see FIG. 2) designed to accommodate two winding bobbins of different sizes on the two outer "legs" or magnetic flux conducting paths 22 and 24 of the core. Also, one 24 of the outer legs of the core 20 has been modified to include a small air gap 26 for inductive energy storage. This particular leg 24 of the core 20 is designated as the "inductor" portion or section of the IM; all induction functions (which may be associated with either the primary/input side of the converter or the secondary/output side of the converter) are placed on this leg. The remaining ungapped outer leg 22 of the core structure 20 is designated as the "transformer" section or part of the IM, where all of the transformer functions (including the primary winding means and secondary winding means of the transformer) are located. The third, or inner, leg 28 of the core 20 is empty of any winding bobbins, and provides a common magnetic flux path for both transformer and inductor operations.

The steady-state operation of the power stage of the converter of FIG. 1, over one switching cycle will now be explained. At the beginning of a switching period, both power swtiches Q1 and Q2 are turned fully ON, allowing energy stored in a filter capacitor C1 to be transferred to the outputs of the converter (via windings NP1, NS1 and NS2), and to the corresponding inductive windings NL2 and NL3 on the other leg 24 of the core structure 20. During this time, secondary diodes D1 and D2 conduct, while output commutation diodes D5 and D6 are kept in an OFF condition. Thus, energy is stored in the inductive leg 24 of the core (via windings NL2 and NL3). On the −12V output, diodes D7 is also kept in an OFF state, permitting filter capacitor C4 to supply load current for this particular output.

Energy buildup in the inductive leg 24 of the core 20 is also being enhanced by current in winding NL1 during this time period (noted as "DTs", where DTs is that part of the switching period when Q1 and Q2 are ON). Current through this particular inductor winding is the dynamic input current to the converter, and is controlled by Q1. Diodes D3 and D4 do not conduct during time DTs.

When Q1 and Q2 are turned OFF by the control system of the converter, both diodes D3 and D4 assume a conduction state, with energy stored earlier in inductive winding NL1 now used to replenish lost energy in capacitor C1 during the switching period DTs. Also, any magnetization energy stored in the transformer leg of the core is now returned to capacitor C1 via D3 and D4.

During the OFF time of Q1 and Q2, IM winding voltage polarities reverse, turning OFF secondary diodes D1 and D2, and allowing diodes D5, D6 and D7 to direct inductive energies associated with NL2, NL3, and NL4 to the three outputs (i.e., +12V, +5V, −12V) of the converter. When Q1 and Q2 are turned ON once again by the control system for another switching cycle, the circuit actions just described are repeated.

Thus, the dynamic current waveforms appearing at the input terminal of the converter (noted as +VS in FIG. 1), as well as at the +5V and +12V outputs points, are nonpulsating with soft rise-and-fall slopes. Capacitors C2 and C3 provide for further filtering of voltage ripple magnitudes produced by these output ripple currents. Since all pulsating currents produced by the converter ON/OFF operations just discussed are contained within the converter system itself, additional input and output filter elements for further noise reduction are either completely unnecessary, or significantly reduced in number and physical size.

Referring to FIG. 1, it should be noted that the secondary windings and corresponding inductive windings on the IM are not isolated form one another, since there is no requirement for separation of output ground potentials of the three DC outputs from the system. This permits a split-secondary winding arrangement and a separation of inductive windings as noted in FIG. 1, so as to achieve a closer tracking of the +5V and +12V outputs as their loads are changed, or as the converter regulation system adjusts the duty cycle "D" of the input power switches Q1 and Q2. Here, windings NS2 and NL2 see the sum of the +5V and +12V currents, while NS1 and NL3 see only +12V current magnitude. This tracking method and winding arrangment is somewhat similar to that used in secondary winding methods for flyback DC-DC converters where all outputs share a common ground return.

FURTHER DESIGN ENHANCEMENTS

Figure 3:
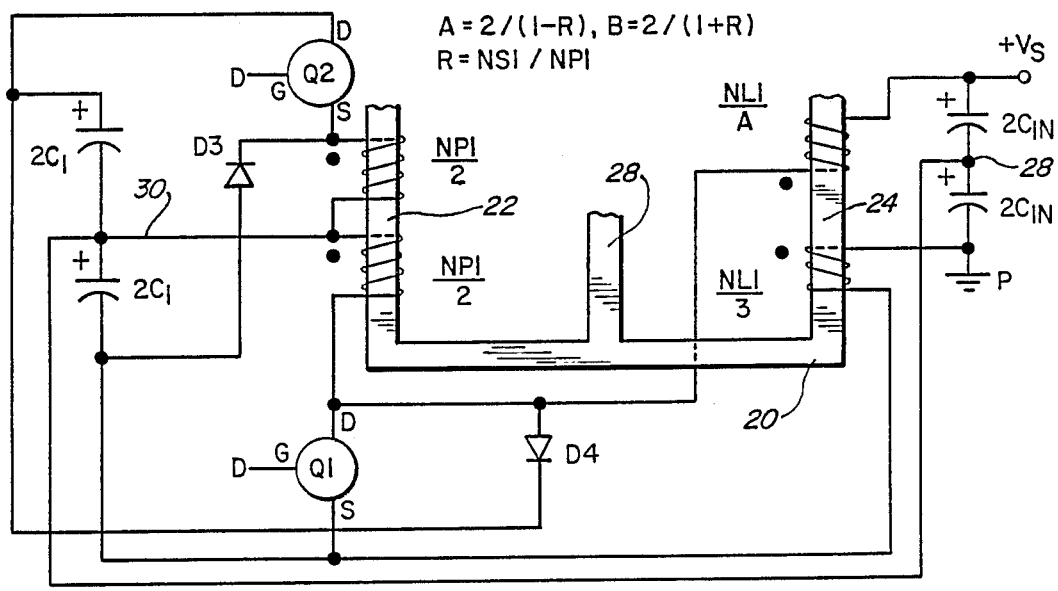
FIG. 3 is a partial schematic diagram of an improved embodiment of the converter shown in FIG. 1.

Alterations to the basic IM converter design of FIG. 1 can be made which can provide improved stress conditions on components therein, plus further reduced conducted common-mode noise on its input power line. Referring now to FIG. 3, the internal storage capacitor C1 of FIG. 1 can be separated into two essentially equal series parts 2C1 and 2C1, and the primary winding NP1 of the IM split into two parts NP1/2 in a like maner and tied to the series connection point 30 of these two capacitors. This variation allows two essentially equal capacitors of lower voltage ratings and increased RMS current capability to be used for C1. Also, the splitting of the primary winding NP1 into two equal parts with a common connection point 30 to the series capacitors assures that Q1 and Q2 will see an OFF voltage stress of nominally ½ that appearing at the "+ terminal" of the upper half of the dual-capacitor network.

To reduce common-mode voltage and corresponding noise at the input terminals of the converter stage, the input inductive winding NL1 in FIG. 1 can be split, as diagrammed in FIG. 3. Here, the coefficients of the "split" division A and B are not equal in all designs in order to achieve the best common-mode voltage reduction, also as noted in FIG. 3. For example, suppose that the NS1/NP1 turns ratio is chosen as the reference ratio for determining the division of the NL1 winding, and that its value is 1/60, which would be equal to "R" in the equations shown the upper part of FIG. 3. Therefore, the upper coefficient for division, noted as "A" here, would be made by design to be 120/59, or 2.034, while the lower coefficient "B" would be 120/61, or 1.967. While both A and B values in this example are very close to an "equal" split of 2, even a slight difference can produce improvement in common-mode voltages noise, making the split-winding method, shown in FIG. 3, for NL1 highly desirable.

Finally, since the input capacitor bank $C_{IN}$ of an AC-to-DC converter is normally split into two series parts (each of value $2C_{IN}$) to accommodate voltage-doubling under 120V line operation, the common connection 28 of this bank can also be tied to the split point 30 of the internal capacitor bank. This insures, once again, an equal division of voltage on all power capacitors of the converter at all times.

IM CORE SIZING AND BIAS CONSIDERATIONS

Figure 2:
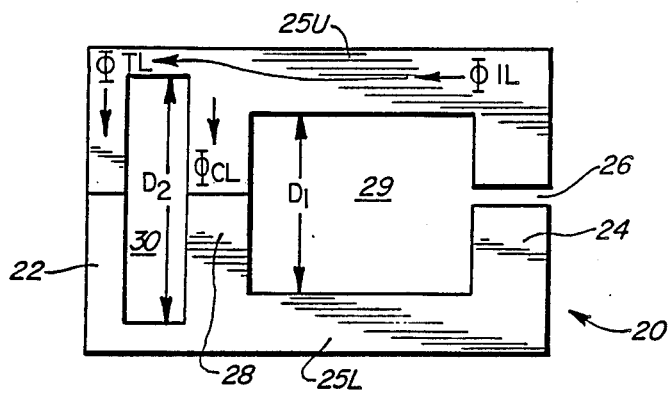
FIGS. 2 and 2A are a plan view and a cross-sectional side view of the core of an integrated magnetic structure for one embodiment of the invention.

From FIG. 1, it is evident that the two winding window areas of the IM structure must be large enough to house the windings of each outer leg bobbin. FIG. 2 shows the core 20 of FIG. 1 with its windings removed. In one embodiment it consists of two similar halves having mating surfaces which are finely ground to ensure a stable magnetic joint, legs 22 and 28, of low reluctance. That leg 24 having an air gap 26 can be provided by grinding back one or both of the opposed faces of that leg. Unlike conventional E—E core designs where a single bobbin is used and is mounted only on the inner leg of the core structure, the converter core 20 of this invention is significantly different.

Figure 2A:
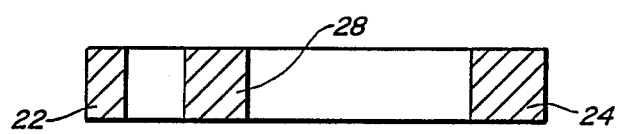

First of all, the winding window areas on each side of the inner leg 28 are different. A larger window area for inductor windings (leg 24) is shown in contrast to that area required for transformer windings (leg 22). Secondly, the cross-sectional areas of the three short legs 22, 24, and 28 of the core 20 are not equal (See FIG. 2A) with the largest window area 29 is allocated for the leg 24 where the inductive winding bobbin will be mounted. The smallest window area 30 is allocated for the other outer leg 22 where the transformer winding bobbin will be located. The inner leg 28 has a cross-sectional area slightly smaller than the inductor leg 24 (since a large portion of the flux developed by the inductor windings will pass through this particular leg). Finally, from FIGS. 1 and 3, it is evident that at least five windings need to be mounted on the inductor leg 24 of the core 20, while only four windings at most are needed on the transformer leg 22, remembering that both NP1 and NL1 will be split winding arrangements. The smaller winding window 30 is defined, in part by two long legs 25U and 25L having a cross-sectional area that is thinner, adjacent the smaller winding window 30, than that adjacent the larger winding window 29. Therefore, the long axis D2 of the smaller window 30 is longer than that axis D1 of the larger winding window 29. Clearly, the core design of FIG. 2 makes optimal use of core material which is especially desirable in an IM assembly for a converter.

As far as flux bias produced by the inductor windings is concerned, FIG. 2 shows what is to be expected. Total bias is the sum of the effect of each of the four inductor windings, with a portion of the total bias seen in each of the other two legs of the core. Bias directions are a direct function of the phase relationships between the inductor windings and the tranformer windings. Because the relative value of the reluctance of the gapped inductive leg 24 is much larger than those posed by the other two ungapped core legs 22 and 28, very little flux change produced by transformer winding action will be seen in the inductive leg of the core. However, a significant amount of flux produced by the inductor windings will be seen in the inner 28 and transformer leg 22 of the core 20. This unique situation permits the design of the transformer portion of the IM to be accomplished almost independently from the inductor portion.

The magnitude of the flux bias in each leg is dependent on cross-section areas of the three legs of the core 20, since the reluctance value for each leg is inversely proportional to its area and directly proportional to permeability of the core material. Thus, the area of each leg must be made large enough to sustain its inductive bias plus any additive AC flux magnitudes produced by all other windings.

Because of the high degree of isolation between transformer and inductor legs made possible by the presence of the air gap 26 in the inductive outer leg 24, the bias developed by the inductive leg can be used in a very unusual and effective manner.

Figure 4:
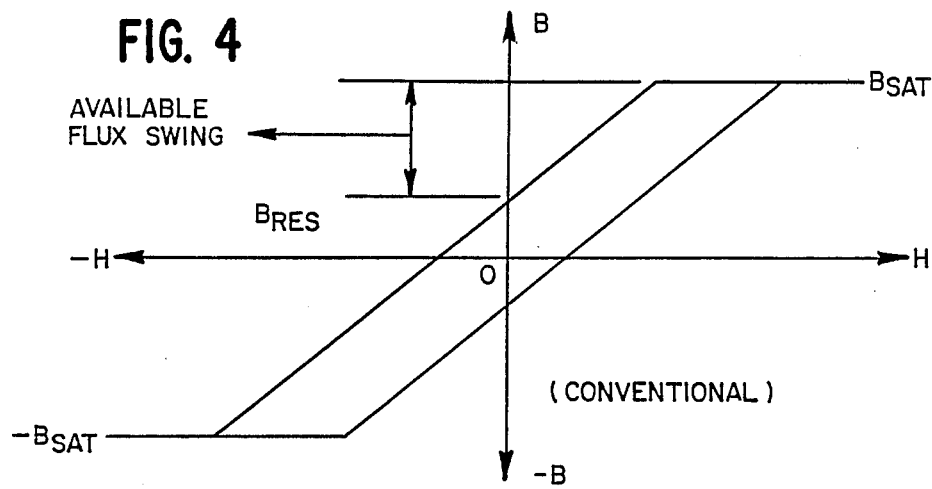
FIGS. 4 and 4A are diagrams of the converter core material characteristic of a two-bobbin core of one embodiment of the invention.
Figure 4A:
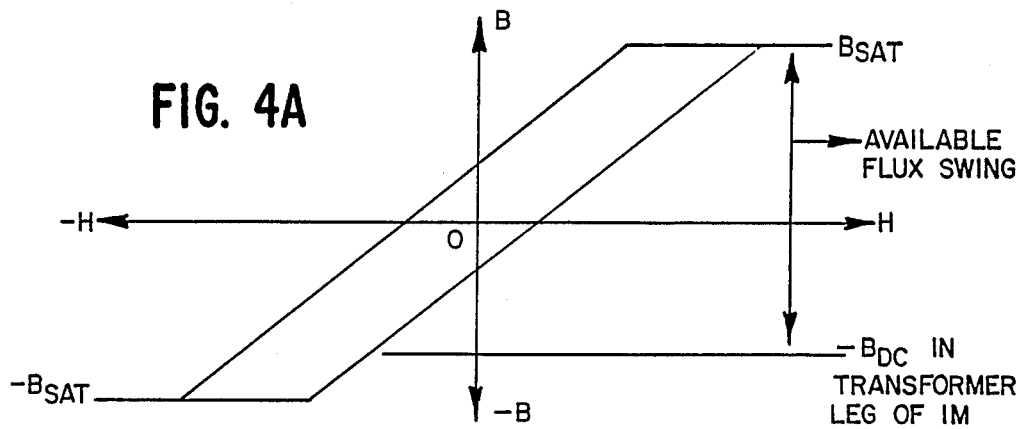

As shown in FIG. 4, in a conventional transformer core used for a transformer-isolated forward, or buck, converter, available flux swing for selecting transformer turns is simply the difference between residual flux $B_{res}$ in the core and the maximum saturation flux level $B_{sat}$ of the core material. However, the bias produced by the inductive leg 24 in the transformer leg 22 of IM core of FIG. 2, allows a much larger swing in flux, as diagrammed in FIG. 4A, since the flux inductive bias will oppose that produced by tranformer action. Therefore, transformer turns needed can be reduced significantly. This, in turn, implies a smaller window area needed for the transformer windings of the IM core structure, plus a corresponding savings in copper power losses for these particular windings.

In one prototype design for a 100 watt converter, the core size was calculated to be 2.7" by 2.25" by 0.75" thick. Further optimization could reduce this size.

IM DYNAMICS

Figure 1A:
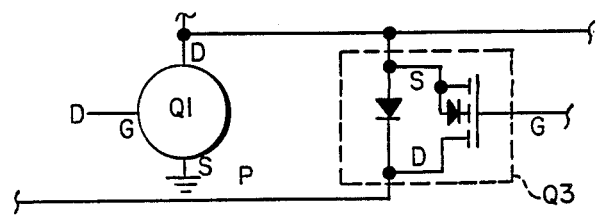
FIGS. 1A through 1E are partial schematic diagrams of further embodiments of the invention.
Figure 1E:
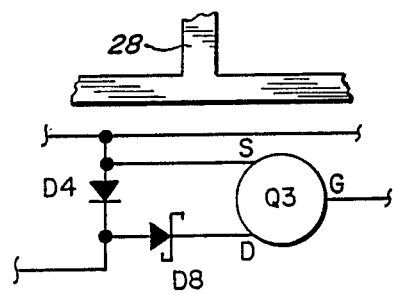

It can be shown (See "Discontinuous Inductor Current Mode in the Optimum Topology Converter", Paper No. 21, pp 369–372, TESLAco Power Electronics Series, Vol. 2) that, for a boost-buck converter system, continuous energy storage in the reactive components will occur if the minimum duty cycle of switch conduction is kept greater than or equal to 0.5 or 50%. This requirement conflicts with the need to provide adequate time for removing the magnetization energy of the transformer part of the converters of FIGS. 1 and 3. Since the primary turns NP1 or NP$\frac{1}{2}$ are used for both power delivery and reset functions, the duty cycle of the switches Q1 and Q2 must be limited to less than or equal to 0.5 to 50%. To satisfy these two conflicting operating conditions, the implication is that the duty cycle of the switches Q1 and Q2 (See FIG. 1) must be always equal to 50% regardless of the input voltage or the output load changes. Since the regulation control system is designed to adjust the duty cycle with such changes to maintain constant output voltages, the converter designs of FIGS. 1 and 3 can be made to operate, in a practical embodiment, if any of the following changes are made:

(1) Change diode D4 in FIG. 1 to a bi-directional switch element Q3 (See FIG. 1A) to allow the boost portion of the converter to operate always in a continuous mode of energy storage regardless of the reflected load from the buck portion. This will allow passage of current through winding $N_{L1}$ in both directions, thus allowing capacitor C1 to discharge unused energy back to the input source $V_S$ under light load conditions on the converter's outputs. FIG. 1E shows another circuit comparable to that of FIG. 1A, using switch Q3 and diode D8 to provide a bi-directional path around diode D4.

Figure 1B:
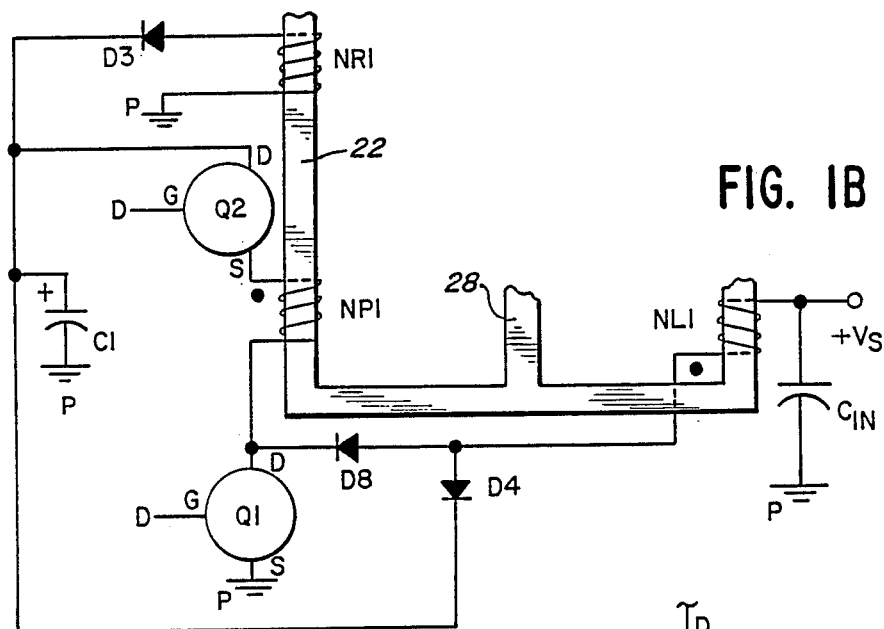

(2) Add a separate reset winding NR1 (See. FIG. 1B) for the transformer leg 22, with appropriate turns to allow a shorter reset time thus increasing the maximum duty cycle allowed for Q1 and Q1 beyond 50%.

(3) Change the power transfer characteristic of the boost portion of the converter such that the boundary of minimum duty cycle of 50% is changed to a lower value, say 25%. This would permit a usable range of duty cycle of control for output voltage regulation against line and load changes.

CHANGE (1)

To accomplish this change requires the use of a power MOSFET device (See FIG. 1A) in place of diode D4, with gate drive applied at times when the two main converter switches Q1 and Q2 are in an OFF state. This change also requires the addition of another drive winding on the control circuit isolation transformer, a minimum of two gate drive resistors and some snubbing network to reduce the turn-on/turn-off energy transients. It can be shown that all three switches Q1, Q2 and Q3 would need to have a drainto-source break down rating of greater than 534 volts, ideally (for D-25% and a 400V line voltage).

CHANGE (2)

To accomplish this change, means another winding must be mounted on the transformer bobbin, increasing the adjacent window area and size of the IM. The number of turns of this winding would have to be lower than those on the primary winding in order that the switch duty cycle maximum could be extended beyond 50%. Diode D3 (See FIG. 1B) is used to commutate the reset energy to capacitor C1 for this winding. Another diode D8 is needed to isolate C1 from switch Q1. The "off" voltage stress on Q1 and Q1 will increase due to the reduction in reset time. For a duty cycle value of 67%, it can be shown that the voltage across the capacitor C1 would be about 600 volts and the reflected voltage into the primary from the reset action during the same time will be approximately 1,200 volts. Thus, the OFF-voltage stress seen by the two switches Q1 and Q2 in FIG. 1B would be on the order of 900 volts. For this reason, the reset method of FIG. 1B, while feasible, may not be acceptable since the voltage stress levels for Q1 and Q2 may approach to that of present state-of-the-art devices, namely 1,000 volts.

Figure 1C:
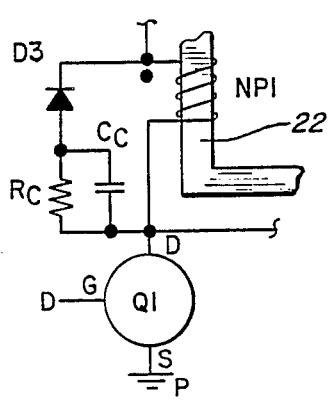
Figure 1D:
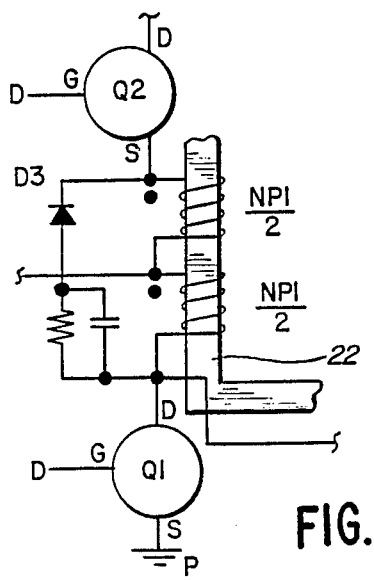

An alternate method for implementing change (2) would be to use a dissipative averaging reset approach, where reset voltage is maintained and adjusted to a proper level as a function of the voltage on capacitor C1. This method is illstrated in FIGS. 1C and 1D, for the converters of FIGS. 1 and 3, respectively (Also, see "International Rectifier HEXFET Data Book", 1982–1983 Edition, pp A-87 through A-98). It can be shown that the stress levels in switches Q1 and Q2 would be about 100 volts less than that of change (1) and that a 1,000 volt device would be acceptable for switches Q1 and Q2, which devices are readily available. However, it must be remembered that this solution is a dissipative one, one in which power is wasted in resetting the core.

CHANGE (3)

Change (3), if it can be accomplished without a significant adidtion of more parts to the converter and/or increases in stress on converter components, is the most desirable. However, how this change in power transfer characteristic can be implemented without altering the desired boost-buck nature of the converter systems of FIGS. 1 and 3 is not at all obvious.

It should be apparent that any acceptable solution must alter the boost portion of the converter such that minimum duty cycle to maintain continuous mode can be moved below 50%, and to a point where duty cycle can be practically varied to regulate outputs with changes in input and output voltage loads. Also, such alternations must not cause excessive stress on switches or diodes and, ideally, should be accomplished with the least member of new components.

Figure 5:
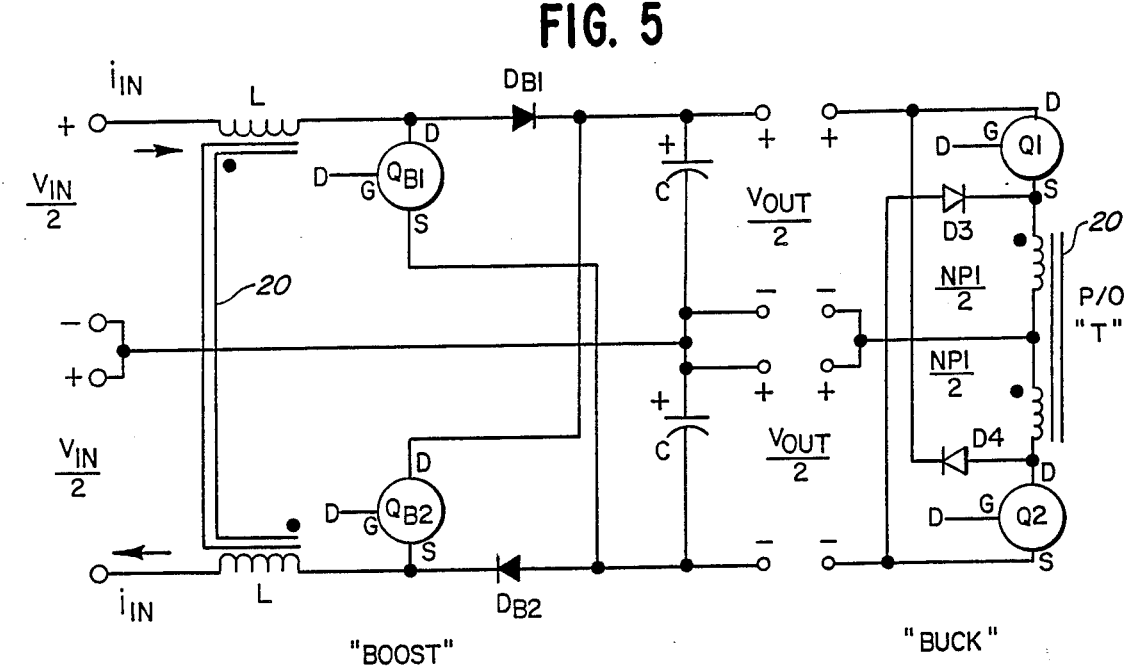
FIGS. 5, 5A and 5B are schematic diagrams of the front end of another embodiment of a converter that is the subject of the present application.

Consider the boost part of the converter arrangement of FIG. 5. which follows the teachings of this invention. Looking at the left-hand portion of the figure, the basic boost topology ahs been altered to add one-half of its output voltage in series with each switch QB1 and QB2, rather than connection of the switch to the return terminal of the input source, as is done in a conventional boost converter topology. Also, it is assumed that the value of this added source voltage is of the polarity shown.

Assuming, that the boost part of the converter in FIG. 5 is operating in a continuous mode of energy storage, the ideal input-to-output voltage transfer function of the revised boost section can be evaluated by establishing the volt-second balance relationship across the inductor L over one switching period of performance. By comparing the requirement for the continuous mode operation defined for the boost design of FIG. 5 against that needed for the boost section of FIGS. 1 and 3, it can be shown that, for minimum duty cycles greater than ⅓ or 33%, the design of FIG. 5 has a lower boundary limit for a given minimum load, switching frequency and inductor values. This new design also has a lower limit on maximum switch duty cycle over that of the conventional approach, namely 50%, ideally, rather than 100% for the basic circuit. This fact alone suggests that the new design shown in FIG. 5, if used in place of the basic boost part of the IM converter arrangement of FIG. 1, will allow operation of both the boost and buck portions in a continuous energy storage mode below the 50% limit previously established.

Figure 5A:
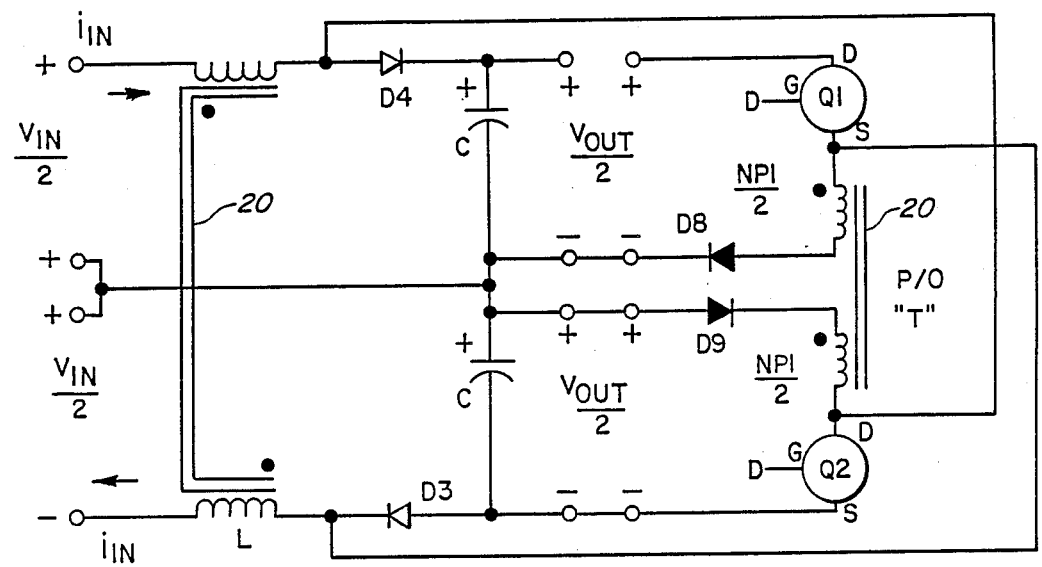

Consider now the interface required between the design of FIG. 5 and that proposed earlier in FIG. 3 for the "split" input inductor enhancement to the "forward" or buck portion of the IM converter. Since all four switch sets illustrated in FIG. 5 operate at the same duty cycle, it is possible to eliminate the switch sets associated with the boost stage QB1 and QB2 by allowing Q1, Q2, D3 and D4 to perform their functions. The unique design that results from this elimination is illustrated in FIG. 5A. Note that two isolation diodes D8 and D9, each in series with one-half of the primary winding NP1, are now required to keep this split winding isolated from the input source. Also, the primary winding must now be split into two separate but equal windings, rather than a split, or tapped, arrangement illustrated in FIGS. 3 and 5.

If a comparison is made now of the basic converter design of FIGS. 1 and 3 to that of FIG. 5A, it is found that two isolation diodes (D8 and D9) have been added over that of the original converter. Also, the split primary winding of the IM must now be changed to two separate but equal windings, and the location of diode D3 must be changed. FIG. 6 shows the design of FIG. 5A in a format identical to that of FIG. 3 for comparison purposes.

Figure 5B:
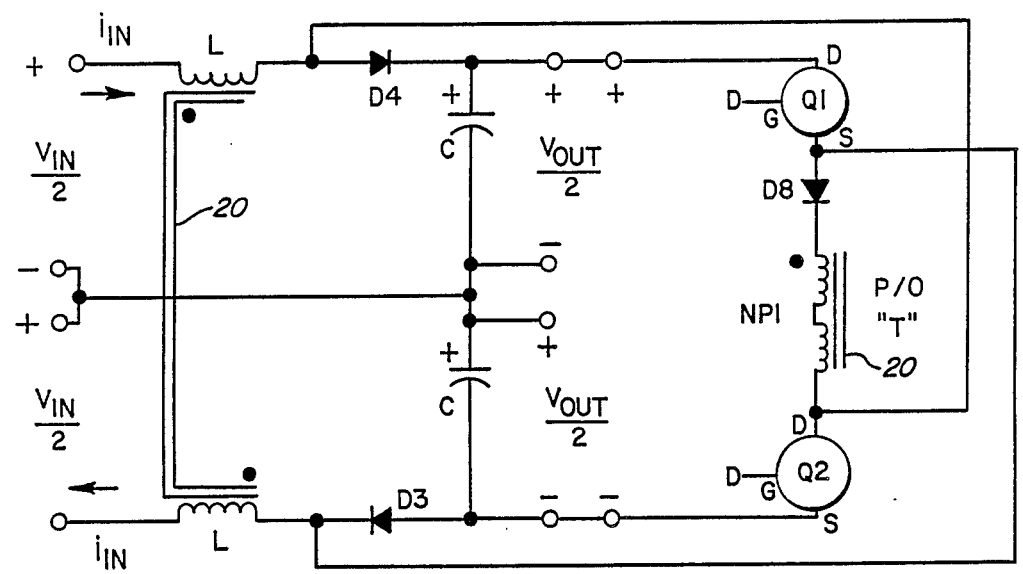
Figure 8:
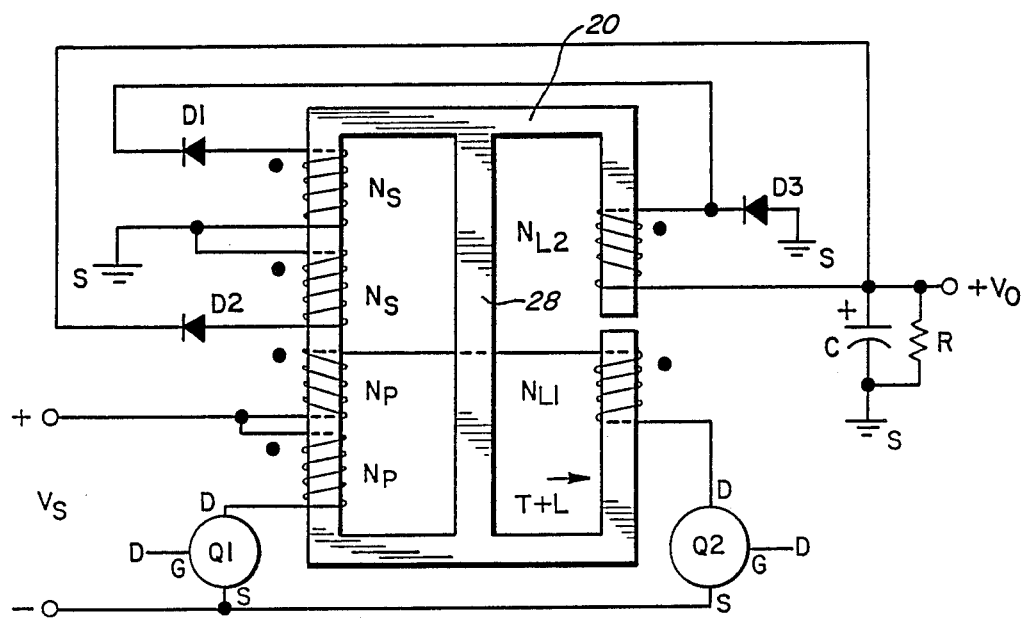
FIGS. 8 through 17 are schematic diagrams of additional embodiments of the invention.

Even simpler versions of FIGS. 5A and 6 can be realized by eliminating the split primary windings, and by using only one isolation diode in series with the total primary winding. The new circuits are shown in FIGS. 5B and 6A, respectively, where diode D8 is the needed isolation diode for the single primary winding. Therefore, in these versions, only one more diode is added to the basic design over that in FIGS. 1 and 3.

It can be shown that a usable range of duty cycle control between 25 and 50 percent exists for the IM converter of FIGS. 5A, 5B, 6 and 6A. It also can be shown that in the circuit version shown in FIGS. 5B and 6A, the voltage stress levels for D3 and D4 are the same, while the single isolation diode D8 will see the total output voltage of the boost section, or 800 volts. Thus, the rating of D8 in this regard would be twice that needed for the isolation diodes D3 and D4 of FIGS. 5A and 6.

COMPARISONS—ALL SOLUTIONS

Based on the foregoing discussion, a summary table can be formulated of the pros and cons of each circuit change. This table is shown below:

TABLE I

| ITEM | CHG #1 | CHG #2 | CHG #2A | CHG #3 |
|---|---|---|---|---|
| # MosFet Switches | 3 | 2 | 2 | 2 |
| # Diodes (primary) | 3 | 3 | 3 | 3 min |
| $V_{D-S}$ (max) ideal | 534 V | 909 V | 800 V | 800 V |
| $V_R$ (primary diodes) | 534 V | 606 V | 800 V | 800 V |
| D range | ≦0.5 | ≦0.5 | ≦0.5 | 0.25 to 0.5 |
| $L_1$ value** | $L_2/n_1^2$ | $L_2/n_1^2$ | $L_2/n_1^2$ | $L_2/n_1^2$ |
| $n_1$ value | 1/20* | 1/60* | 1/60* | 1/30* |

*Assumes minimum duty cycle of 25% at high line, and 75% transformer efficiency.
**Where $n_1$ is $N_{S2}/N_{P1}$, $L_1$ is the primary inductance and $L_2$ is the output inductance.

From Table I, it is evident that either alternatives for circuit change (2) will result in more primary turns for the transformer section of the IM than those noted for change (1) or change (3). However, for change (3), the relative inductance of the primary inductive winding $L_1$ will need to be four times larger than the other three circuit alternatives, implying the need for more turns in this area of the IM.

Thus from Table I, change (1) offers the lowest OFF voltage stress to all primary switches and diodes, allowing a less-expensive MOSFET devices to be used over those needed for changes (2) or (3). However, as noted earlier, change (1) will require additional parts for driving the extra MOSFET device plus those needed for voltage snubbing. In addition, because of the relative slow recovery times expected from the internal body-to-drain diode of Q3 in FIG. 1A, an external commutation diode will be needed to perform this function. Also, to prevent conduction of the MOSFET diode, another low-voltage diode (Schottky) must be added in series with Q3. Thus, a practical implication of this solution will add two more diodees to the circuit of FIG. 1A, as illustrated in FIG. 1E.

Circuit change (3), while adding one more diode to the basic design concept of the converter and having voltage stress levels comparable to alternate change (2), but 266 volts greater than change (1), is attractive in that no additional MOSFET devices are required. For these reasons, change (3) is considered optimum. Devices to be considered for these MOSFETS are the Philips (Siemens) BU 50A and the MOTOROLA MTP3N100 or MTH5N100. These parts have a breakdown rating of 1000V and drain current maximums well within those needed for a 100W converter application.

DETAILED EMBODIMENT

Figure 7:
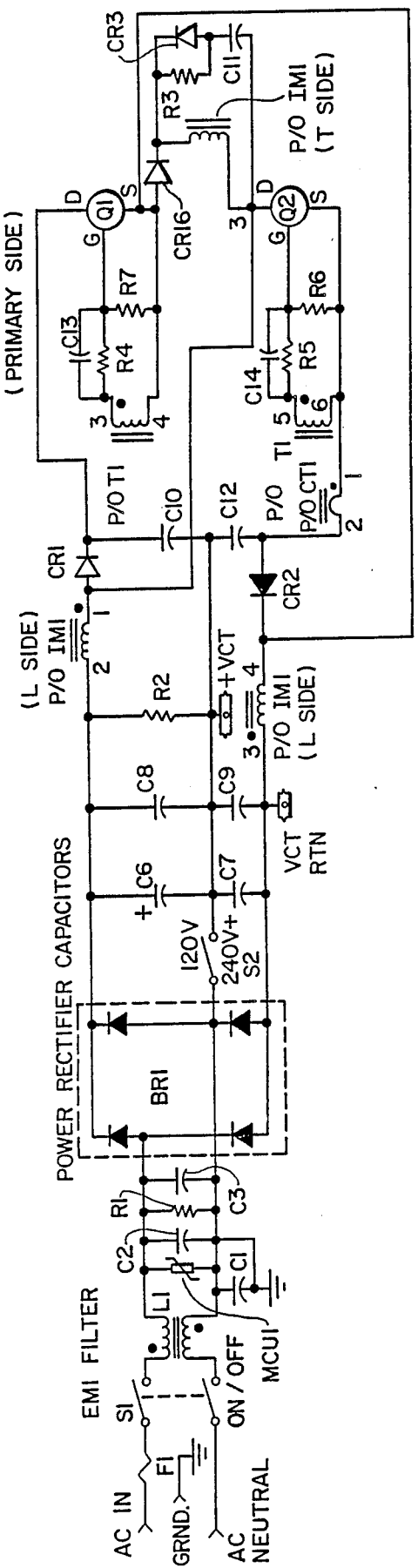
FIGS. 7, 7A, and 7B are detailed schematic diagrams of one practical embodiment of a converter system which incorporates the principles of the invention.
Figure 7A:
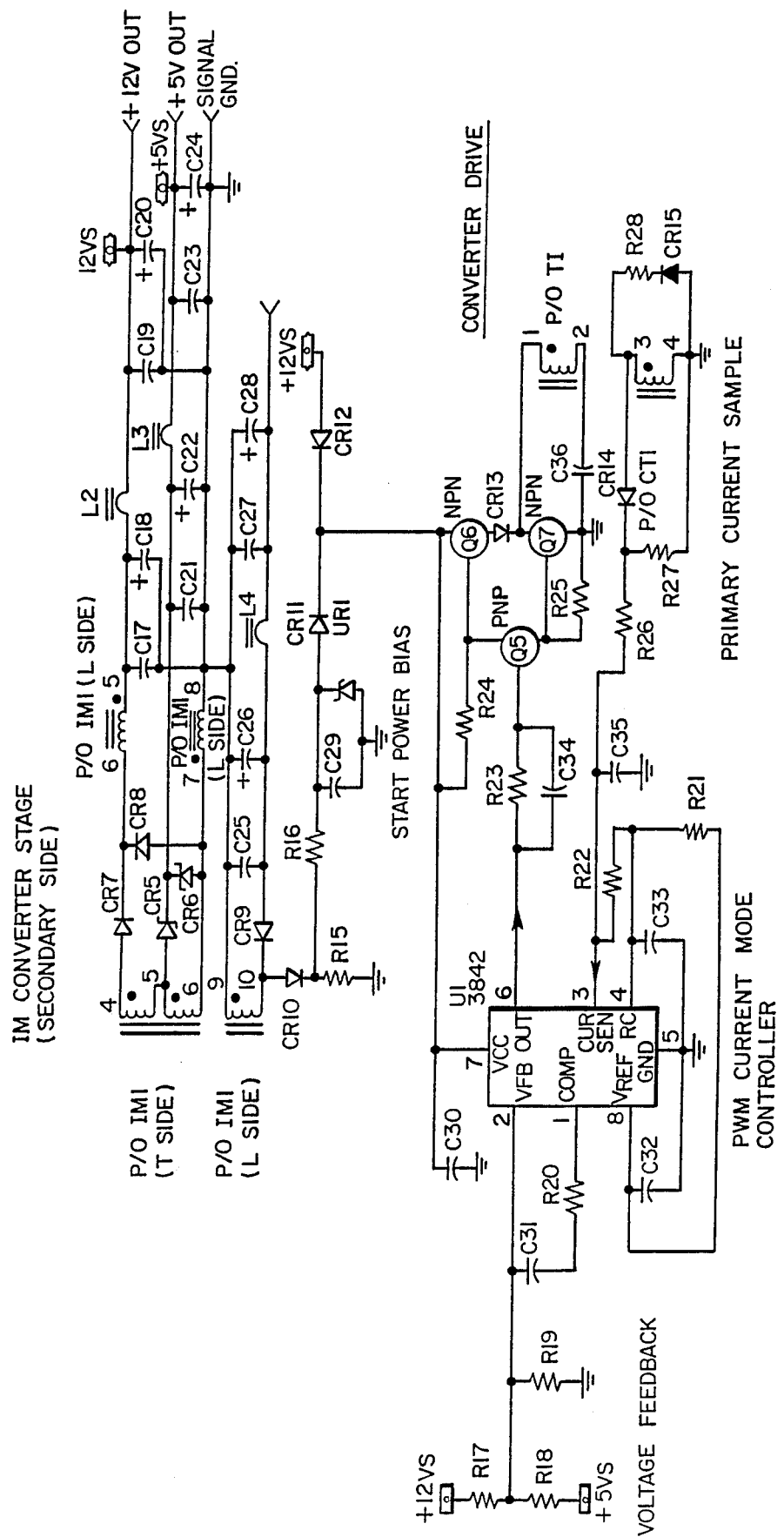
Figure 7B:
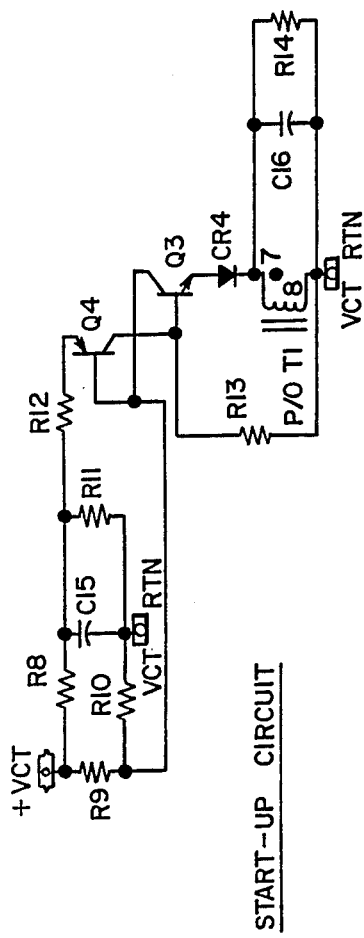

FIG. 7 is a circuit schematic of the IM power converter system of FIG. 3 embedded within a complete power supply, including AC-to-DC networks to develope the high DC input voltage for it, a starting network, and current-mode regulation control circuits. Important circuit areas and functions are noted by the captions on FIGS. 7, 7A, and 7B. This converter is designed to deliver 100 watts of power to three different DC outputs of +5V, +12V, and −12V. Incoming AC potential can range between 90 VDC and 270 VDC. The core of the integrated magnetics (IM1), for a 100 KHz operating frequency, can be made of ferrite material.

The AC-to-DC rectifier network, plus the EMI FILTER circuit preceding it, is of a conventional design, with a simple manual switch S2 indicated for accommodating either a 120V, 60 Hz or a 240V, 50 Hz AC input voltage.

The START-UP CIRCUIT is quite novel, in that starting power is developed directly through the main IM converter stage, rather than using a separate bias converter. At AC power application, a DC voltage VDC is applied to the start circuit, which charges capacitor C15 to a potential where Q3 and Q4 turn ON. With Q3 and Q4 ON, the energy built up in C15 is then dumped into winding 7-8 of the gate drive transformer T1, which controls the main IM converter power switches Q1 and Q2. This short pulse of energy then turns ON switches Q1 and Q2 which, in turn, produce a voltage at winding 9-10 of the IM of a polarity to allow capacitor C29 to be charged rapidly to the voltage level of zener diode VR1. The energy stored in the capacitor C29 by this action allows the regulation integrated circuit U1 to be activated, as well as the output CONVERTER DRIVE network (composed of Q5 through Q7). The pulse-width-modulation (PWM) network within U1 then takes control of the converter DRIVE NETWORK, turning ON and OFF Q1 and Q2, via T1, until output voltages build up to their desired values. Once the CONVERTER DRIVE network is controlled by the PWM actions of U1, the START-UP CIRCUIT is disabled. The disable method is via T1, such that each time Q7 in the CONVERTER DRIVE network is turned ON, winding 7-8 receives a pulse of voltage polarity to once again turn on Q3 and Q4, preventing build-up of sufficient energy in C15 to turn on Q4 in the manner discussed earlier upon the initial application of AC power to the system.

The CONVERTER DRIVE network is designed so as not to load the start-up winding 7-8 on T1 during an actual start-up sequence. This blocking action is performed by diode CR13 and the base-to-collector diode of Q7 in the CONVERTER DRIVE network. Once the +12V output has reached its desired value, it is used to power U1 and the converter drive system via CR12. Energy is no longer drawn from C29 since diode CR11 will become reverse-biased.

To maintain voltage regulation of outputs during steady-state operation, both the +12V and −5V lines are used to provide a sample of output potentials for PWM control purposes. This is performed by the VOLTAGE FEEDBACK network of resistors R17, R18, and R19. Frequency compensation for stability of voltage regulation control are the functions of C31 and R20. The 100 KHz switching frequency of PWM operation of U1 is set by resistor R21 and capacitor C33. The primary CURRENT SAMPLE of dynamic switch currents in the IM converter is taken via current transformer CT1, and transformed to a voltage value via CR14 and resistor R27 tied to the secondary of CT1. This sample is then passed thru a high-frequency RC filter (R26 and C35) to remove undesirable switching noise, and is then used internally by U1 with the output voltage samples to determine the duty cycle of condition of the power switches within the IM converter to maintain constant output potentials with changes in load and input AC line potential.

OTHER EMBODIMENTS

Figure 9:
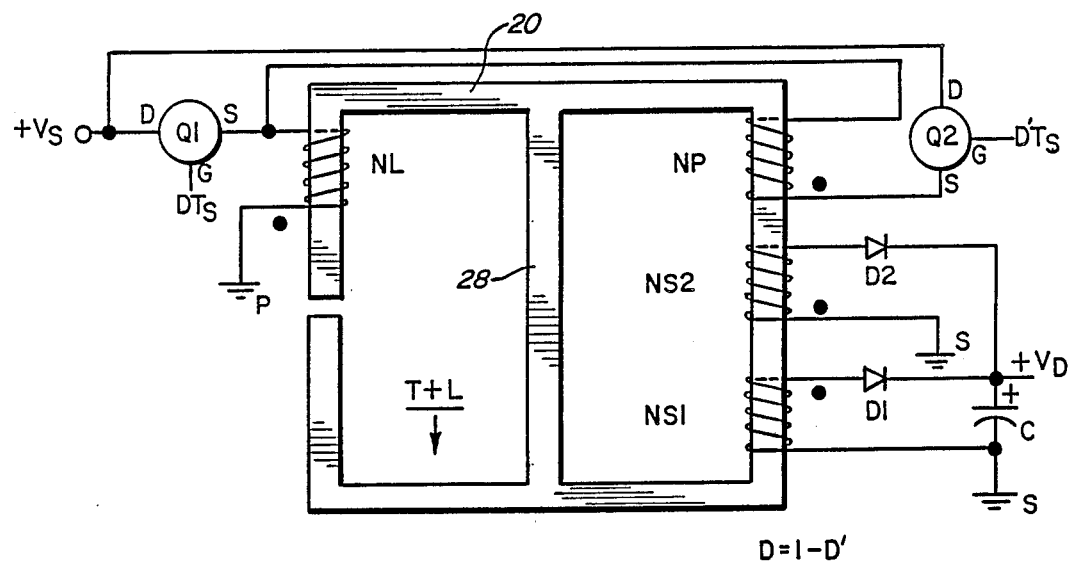
Figure 10:
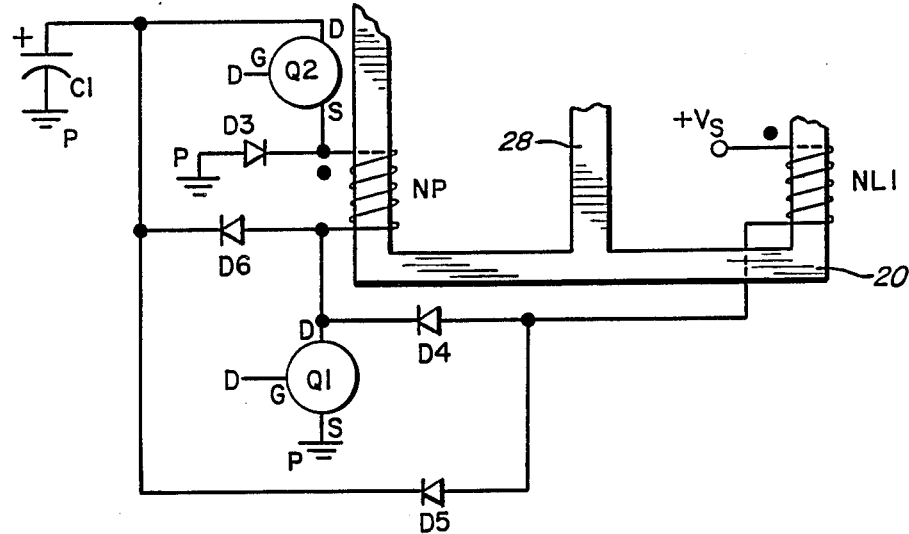
Figure 11:
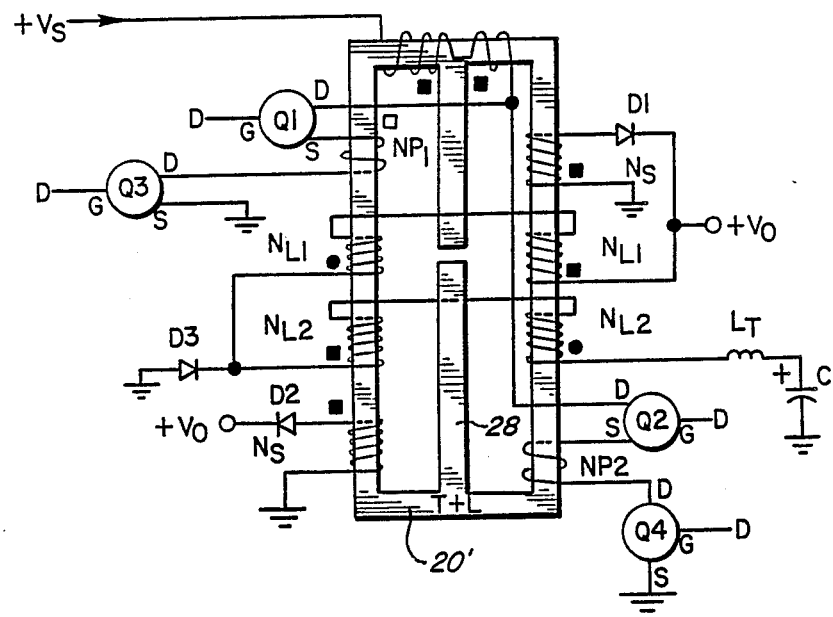
Figure 12:
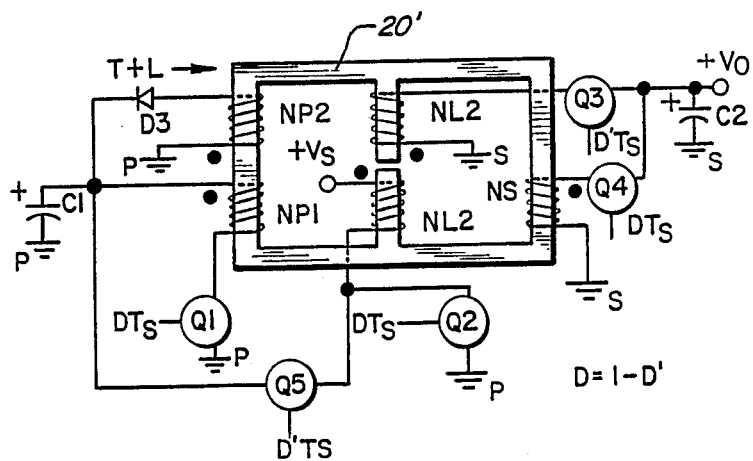

From the foregoing, it will be observed that numerous variations and modifications may be effected without departing from the true spirit and scope of the novel concept of the invention. For example, FIG. 8 disclopses an IM push-pull buck converter having a center-tapped primary winding, a center tapped secondary winding, and two inductors, one connected to the primary side of the converter and one connected to the secondary side of the converter. FIG. 9, by contrast, illustrates a boost converter having a single primary winding, two secondary windings, and one inductor winding, with the duty cycle of the switch-controlled primary winding NP and the switchcontrolled controlled inductor winding NL being complementary. FIG. 10 illustrates an integrated-magnetic boost-forward converter comparable to the design of FIG. 1, with an added diode D6 for resetting the IM core. All of these embodiments (FIGS. 8, 9, and 10) are two-bobbin designs with a core having one outer leg on which the transformer windings are carried, a center leg, and a gapped outer leg which carries only the inductor windings. These basic principles can be expended to an integrated-magnetic two-bobbin core where the ungapped outer legs carry either primary, secondary, or inductor windings, and wherein the empty center leg is gapped. This concept is illustrated in FIG. 11. Also shown in FIG. 11, are added windings NL2 to each outer leg for control of ripple current appearing at the output of the converter. This control is achieved by proper values of the inductor LT and the capacitor C in FIG. 11, and the turns ratio between windings, NL1 and NL2. Finally, FIG. 12 illustrates an integrated-magnetic boost-forward converter with a bi-directional power flow capability. It should be noted that five solid-state bi-directional switches are used (in FIG. 12) with the duty cycles (D and D′) of conduction of all the switches being complementary.

Figure 13:
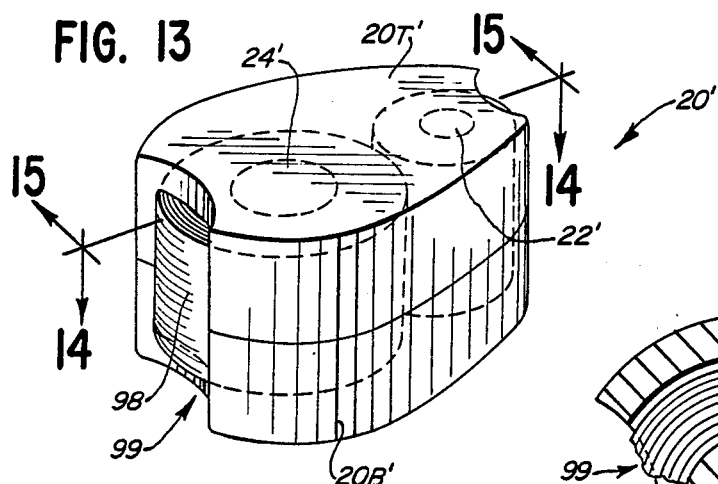
Figure 14:
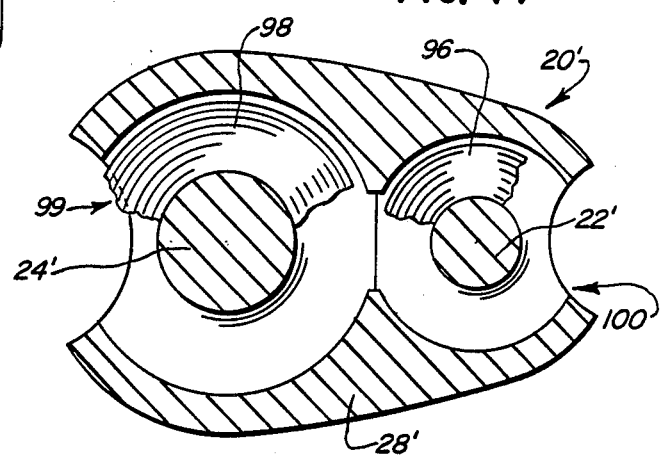
Figure 15:
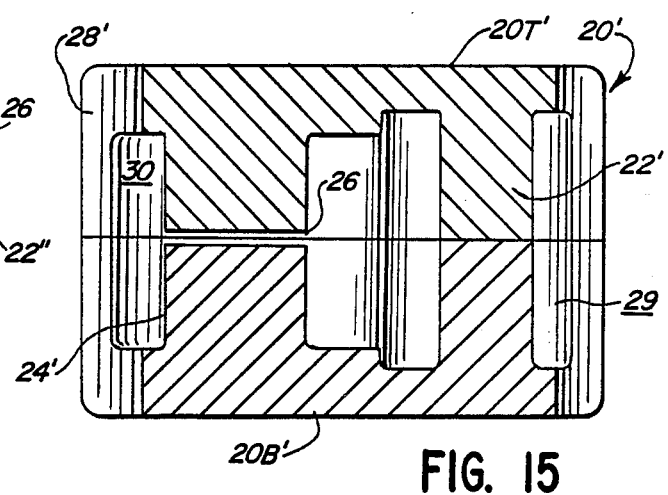

Moreover, the design of the core 20 need not simply incorporate only two winding windows 29 and 30. Similarly, the common flux path for the two-bobbins need not be in the form of an inner leg 28. FIGS. 13, 14 and 15 are illustrations of a ferrite pot-like core 20′ wherein there is provided a leg 22′ for the transformer windings, a leg 24′ for the inductor windings, and a common flux return path 28′ in the form of a generally "tear-drop" shaped housing which substantially surrounds or has the two-bobbin legs 24′ and 22′ at its interior. Peripheral wall or housing openings 99 and 100 are provided at each end for access to the bobbin windings 96 and 98. As before the cross-sectional area of the transformer leg 22′ is less than that of the inductor leg 24′ and two winding windows have unequal area. As illustrated, the core 20′ is formed from two cuplike elements or parts 20T′ and 20B′. These two elements are shown as being two generally identical halves; they need not be identical or exact halves. One element can carry one leg or both legs. One advantage of this core design is that, by virtue of surrounding the two-bobbin windings 96 and 98 with a magnetic structure, they are shielded from the surroundings. Moreover, the overall shape is smaller (perhaps as much as one-half) than that of FIG. 2 for the same power rating. In some applications, there may be an advantage in using the tear-drop shape. Some regulatory agencies may require the separation of FIG. 2 for an off-line converter. Although, a tear-drop shape is illustrated, other shapes should be suggested by using the same concept of a flux return path 28′ at the exterior or on the outside of the winding bobbins. The result is a compact design that minimizes the weight and size of the integrated magnetics assembly of the converter.

Figure 16:
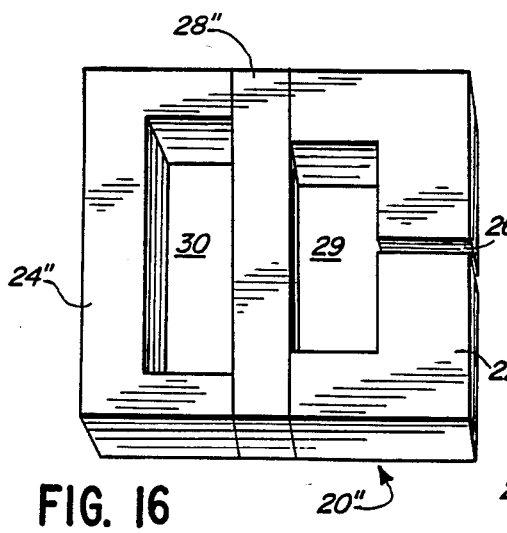
Figure 17:
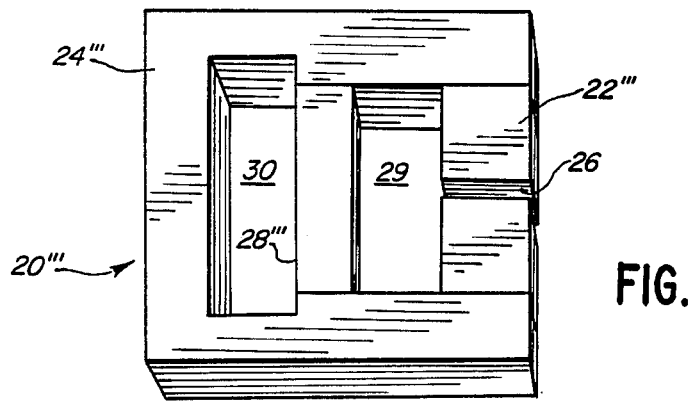

Other core arrangements, similar to that of FIG. 2, are illustrated in FIGS. 16 and 17. In FIG. 16, the core 20" is formed from two C-shaped parts which carry the winding and an I-shaped return leg. In FIG. 17, the core 20" is formed from one large U-shaped part and two enclosed I-shaped parts. Two F-shaped halves could also be used. Thus, it should be understood that no limitation with respect to the specific structure and circuit arrangements illustrated is intended or should be inferred. It is, of course, intended to cover by the appended claims all such modifications as fall withint the scope of the claims.

I claim:

1. In a power converter with integrated magnetics, a two bobbin magnetic core having in cross-section only two winding windows of unequal area, said core comprising:

a relatively long and narrow winding leg which is adapted to receive primary and secondary winding means of a transformer and which defines at least part of a smaller winding window;

a relatively short and wide winding leg which defines at least part of a larger winding window and which is adapted to receive winding means of an inductor, said short and wide winding leg having an air gap intermediate its ends; and coupling means for magnetically coupling said two winding legs and forming a common magnetic flux path and for defining the remainder of said smaller winding window and the remainder of said larger winding window, said coupling means including at least two long legs of magnetic material which are located generally parallel to one another and perpendicular to said long and narrow winding leg and said short and wide winding leg, at least one of said two long legs having a cross-sectional area adjacent the smaller winding window which is less than the cross-sectional area of that long leg adjacent the larger winding window.

2. The converter core of claim 1, wherein said coupling means comprises a third leg which is disposed between said two long legs and at unequal distances from said winding legs.

3. The converter core of claim 1, wherein said coupling means includes magnetic material means, joining said two long legs and generally parallel to said winding legs, for shielding said winding means of said inductor and said winding means of said transformer.

4. The converter core of claim 3, wherein said magnetic material means is located on each side of a plane which contains the winding axes of said two winding legs.

5. The converter core of claim 1, wherein said coupling means comprises one coupling leg which is disposed between said two winding legs, said two winding legs being located adjacent the ends of said two long legs, said one coupling leg being closer to said long and narrow winding leg than said short and wide second winding leg and having a cross-sectional area greater than said long and narrow winding leg and less than said short and wide winding leg, said long and narrow winding leg being adapted to receive a bobbin carrying primary and secondary winding means of said transformer, and said short and wide winding leg being adapted to receive a bobbin carrying winding means of said inductor.

6. In a power converter, a magnetic core comprising: two core elements which when put together define a two bobbin core having only two winding windows of unequal area and a tear-drop shaped cross section when viewed from a plane that is perpendicular to the winding axis of said bobins, at least one core element having:

a base of magnetic material which carries at least one leg of magnetic material which is connected at one of its ends to said base and which is disposed generally parallel to and spaced apart from another leg which is disposed generally perpendicular to said base and which is adapted to receive a bobbin carrying primary and secondary winding means of a power transformer, said one leg being adapted to receive a bobbin carrying winding means of an inductor and having a length such that when said two core elements are put together said one leg defines an air gap; and coupling means, cooperating with the other core element, for providing a magnetic flux return path for said two legs, said coupling means comprising wall means at the periphery of its base for at least partially walling-off the interior of said base.

7. The converter core of claim 6, wherein said wall means is closer to said another leg.

8. The converter core of claim 6, wherein one leg has a cross-sectional area greater than said another leg and a length less than that of said another leg.

9. The converter core of claim 6, wherein said coupling means comprises a third leg disposed between and generally parallel to said one and said another legs, said one leg and said third leg defining one winding window and said third leg and said another legs defining a second winding window, the smaller winding window having a side which is defined in part by said third leg and which is longer than an adjacent side of said larger winding window.

10. The converter core of claim 6, wherein said core elements when joined together define, in cross-section, only two generally rectangular winding windows of unequal area.

11. The converter core of claim 6, wherein said coupling means is positioned relative to said one and said another legs to electro-magnetically shield said one and said another legs.

12. The converter core of claim 6, wherein said core elements and symmetrical relative to a plane which is parallel to a plane which is perpendicular to the winding axes of said one and said another legs.

13. In a power converter a core for an integrated magnetics assembly, comprising:

(a) an outer leg which is adapted to receive the primary and secondary windings of the transformer part of the integrated magnetics assembly;

(b) an inner leg having a cross-section greater than said outer leg and at a spaced distance from said outer leg, said inner leg and said outer leg being generally parallel to each other and defining at least part of a winding window for primary and secondary windings of said transformer part, said spaced distance defining the width dimension of said winding window for said primary and secondary windings;

(c) a gapped leg which has a cross-section greater than said inner leg, which is adapted to receive a winding of the inductor part of the integrated magnetics assembly, and which is at a greater spaced distance from said inner leg than said outer leg, said gapped leg and said inner leg being generally parallel to each other and defining at least part of a larger winding window for the windings of the inductor, said greater spaced distance defining the width dimension of said larger winding window, said larger winding window for said inductor windings having a height dimension less than the height dimension of said winding window for said primary and secondary windings; and (d) means for magnetically coupling together said outer leg, said inner leg and said gapped leg.

14. In a power converter with integrated magnetics, a core having only two winding windows comprising: two core parts which when put together define two winding windows of unequal area with at least one of said core parts having one leg which is adapted to carry the windings of a transformer and which joins the other core part and having another leg which is thicker than said one leg and which is adapted to carry the windings of an inductor, said windings of said transformer passing through the smaller winding window and said windings of said inductor passing through the larger winding window, said other core part having coupling means for magnetically coupling and shielding said one leg and said another leg, said another leg cooperating with said other core part to define an air gap.

15. In a power converter with integrated magnetics, a core having only two winding windows comprising: two core parts which when put together define two winding windows of unequal area with at least one of said core parts having one leg which is adapted to carry the windings of a transformer and which joins the other core part, said other core part having another leg which is thicker than said one leg and which is adapted to carry the windings of an inductor and having coupling means for magnetically coupling and shielding said one leg and said another leg, said windings of said transformer passing thorugh the smaller winding window and said windings of said inductor passing through the larger winding window, said another leg cooperating with said one core part to define an air gap.

16. In a power converter with integrated magnetics, a core having only two winding windows comprising: two ferrite core parts which when brought together form said core having in cross-section two winding windows of unequal area, at least one of said core parts having one leg which is adapted to carry the windings of a transformer about its winding axis, having another leg which has a winding axis which is parallel to and spaced apart from said winding axis of said one leg and which is adapted to carry the windings of an inductor, and having coupled means, generally surrounding the exterior of said one leg and said another leg, for magnetically coupling and shielding said one leg and said another leg, the windings of said transformer passing through the smaller winding window and the windings of said inductor passing through the larger winding window, said one leg having a cross-sectional area less than that of said another leg.

17. The converter core of claim 16, wherein said two core parts form two generally identical core halves.

18. The converter core of claim 16, wherein said coupling means comprises a magnetic flux conductor which has a cross-sectional area adjacent the smaller winding window which is less than its cross-sectional area adjacent the larger winding window.

19. The converter core of claim 16, wherein said coupling means comprises a third leg which is parallel to and which is disposed between said one leg and said another leg.

20. The converter core of claim 19, wherein said third leg is closer to said one leg than said another leg.

21. The converter core of claim 19, wherein said third leg has a cross-sectional area greater than said one leg and less than said another leg.

22. The converter core of claim 19, wherein said another leg has a portion having magnetic permeability that is different than that of the remainder of that leg.

23. The converter core of claim 16, wherein each core part comprises coupling means, each coupling menas comprising a magnetic flux conductor, with said one leg and said another leg disposed between and generally perpendicular to said two magnetic flux conductors.

24. The converter core of claim 23, wherein said coupling means of said core parts define at least one opening adjacent to said one leg and another opening adjacent said another leg for access thereto.

25. A power converter integrated magnetics core, comprising: a first pot core which is adapted to receive transformer means for said converter; and a second pot core which is adapted to receive inductor means for said converter, said first pot core and said second pot core being magnetically coupled together, said first pot core having a winding window whose cross-sectional area is different form the area of the winding window of said second pot core.

26. In a converter having a power transformer and at least one inductor, a magnetic core having only two winding windows of unequal area, with primary winding means and secondary winding means of a transformer passing through the smaller winding window and inductor winding means of the inductor passing through the larger winding window, said core comprising:

at least two long sections of magnetic material which are located generally parallel to one another;

at least three short sections of magnetic material which are carried between said long sections and which are disposed generally parallel to each other and generally perpendicular to said long sections to define said two winding windows of unequal area, said three short sections having unequal cross-sectional area and being unequally spaced from one another, that short section with the smallest cross-sectional area being adapted to receive the winding means of the transformer and that short section with the largest cross-sectional area being adapted to receive windings of at least one inductor; and at least one of said two long sections having a cross-sectional area which is adjacent the smaller winding window and which is less than the cross-sectional area of that long section which is adjacent the larger winding window and having a substantially straight edge which defines part of each of said two winding windows.

27. A core for the integrated magnetics of a power converter, comprising: one center leg which is adapted to receive transformer means for said converter; a second center leg which is laterally spaced apart from said one center leg and which is adapted to receive inductor means for said converter; and magnetic means for at least partially encapsulating said two center legs.

28. The core of claim 27, wherein said two center legs and said magnetic means define two winding windows of unequal area.

* * * * *